United States Patent
Toncelli

(10) Patent No.: US 9,199,415 B2
(45) Date of Patent: Dec. 1, 2015

(54) PROCESS FOR THE MANUFACTURING OF SLABS OR BLOCKS OF CONGLOMERATE OF STONE GRANULATE AND POLYESTER RESIN

(76) Inventor: Luca Toncelli, Bassano del Grappa (IT)

(*) Notice: Subject to any disclaimer, the term of this patent is extended or adjusted under 35 U.S.C. 154(b) by 568 days.

(21) Appl. No.: 12/300,907

(22) PCT Filed: May 23, 2007

(86) PCT No.: PCT/IB2007/051949
§ 371 (c)(1),
(2), (4) Date: Nov. 14, 2008

(87) PCT Pub. No.: WO2007/138529
PCT Pub. Date: Dec. 6, 2007

(65) Prior Publication Data
US 2009/0253829 A1    Oct. 8, 2009

(30) Foreign Application Priority Data
May 31, 2006   (IT) .............................. TV2006A0092

(51) Int. Cl.
| B29C 70/44 | (2006.01) |
| B29C 67/24 | (2006.01) |
| C04B 40/02 | (2006.01) |
| C04B 40/00 | (2006.01) |
| C04B 26/14 | (2006.01) |
| C04B 26/18 | (2006.01) |
| B32B 19/02 | (2006.01) |
| C04B 20/00 | (2006.01) |

(52) U.S. Cl.
CPC ............... B29C 67/244 (2013.01); B29C 70/44 (2013.01); C04B 26/14 (2013.01); C04B 26/18 (2013.01); C04B 40/0067 (2013.01); C04B 40/0089 (2013.01); C04B 40/0263 (2013.01); C04B 40/0272 (2013.01); B29C 2791/006 (2013.01); B29C 2791/008 (2013.01); C04B 20/0076 (2013.01)

(58) Field of Classification Search
USPC .............. 264/69, 71, 102, 109, 126, 319, 333
See application file for complete search history.

(56) References Cited

U.S. PATENT DOCUMENTS

| 3,296,202 | A | | 1/1967 | Schmitz-Josten et al. | |
|---|---|---|---|---|---|
| 4,293,681 | A | * | 10/1981 | Malik | 528/115 |
| 4,608,280 | A | | 8/1986 | Robinson et al. | |
| 4,611,015 | A | | 9/1986 | Hefner, Jr. et al. | |
| 5,264,168 | A | * | 11/1993 | Toncelli | 264/658 |
| 5,728,790 | A | * | 3/1998 | Seki et al. | 526/273 |
| 5,928,585 | A | | 7/1999 | Toncelli | |
| 6,329,473 | B1 | * | 12/2001 | Marten et al. | 525/438 |
| 2001/0023276 | A1 | * | 9/2001 | Schoenfeld | 525/107 |

FOREIGN PATENT DOCUMENTS

| DE | 33 32 080 | 3/1985 |
|---|---|---|
| DE | 19627165 | 1/1997 |
| DE | 10148672 | 4/2003 |
| EP | 0062373 | 10/1982 |
| GB | 1368468 | 9/1974 |
| WO | 03031494 | 4/2003 |
| WO | 2004/004882 | 1/2004 |
| WO | WO 2005030474 A1 * | 4/2005 |
| WO | 2005111126 | 11/2005 |
| WO | 2006122892 | 11/2006 |

OTHER PUBLICATIONS

Boquillon et al. Polymer 41 (2000) pp. 8603-8613. Polymer networked derived from curing of epoxidized linseed oil: influence of different catalysts and anhydride hardeners.*
International Search Report and Written Opinion dated Oct. 30, 2007 of corresponding PCT/IB2007/051949.
International Preliminary Report on Patentability dated Aug. 6, 2008 of corresponding PCT/IB2007/051949.
Joachim Rosch and Rolf Mulhaupt, Polymers from renewable resources: polyester resins and blends based upon anhydride-cured epoxidized soybean oil, Polymer Bulletin Springer-Verlag, Dec. 31, 1993, No. 6, Berlin, DE.
Russian Official Action dated Apr. 4, 2011, from corresponding Russian Application No. 2008-152375.

* cited by examiner

*Primary Examiner* — Atul P. Khare
(74) *Attorney, Agent, or Firm* — Katten Muchin Rosenman LLP

(57) ABSTRACT

In the manufacture of articles in slabs or blocks according to so-called Bretonstone technology, a polyester resin is employed, free of reactive solvents, formed by the reaction between an epoxidized triglyceride and at least one carboxylic anhydride.

11 Claims, No Drawings

PROCESS FOR THE MANUFACTURING OF SLABS OR BLOCKS OF CONGLOMERATE OF STONE GRANULATE AND POLYESTER RESIN

The present invention regards the manufacture of articles of a conglomerate and more in particular a process for the manufacture of slabs and blocks starting from a mixture comprising granulated stone material or the like and a resin-based binder.

A process for the manufacture of articles in form of blocks and slabs of the aforesaid type has been known for years, also known with the generic name of Bretonstone technology, in which an initial mixture is prepared composed of granulated stone material or inorganic or organic stone-like material, having a selected granulometry, and of a hardenable resin-based binder.

This mixture is deposited on a temporary support or in a mould, having the dimensions of the final article, and is subjected to a vacuum compression step, with the accompanying application of a vibratory motion at pre-established frequency.

The resulting raw article is then transferred to a hardening step, at the end of which it has the desired mechanical characteristics.

The resulting slab, which can be obtained from a block by means of sawing, is then sent to the finishing working (sizing, smoothing, polishing and the like).

For more information and technical details regarding the Bretonstone technology, one should examine the European patent No. 786 325 filed in the name of Marcello Toncelli and the International patent application No. PCT/EP2006/062120 filed by the same applicant, both incorporated here for reference purposes.

In the production of agglomerate products based on stone or stone-like granules, according to the Bretonstone technology, one can use resins of structural type. These include polyester resins, acrylic resins, epoxy resins etc.

Using these resins in the Bretonstone technology, one can obtain good quality products with distinguishing characteristic specifications.

The most widespread products are the agglomerates comprising orthophthalic-based polyester resins, diluted with a monomer of reactive synthesis such as styrene.

It is remarkable that the polyester resin is a synthesis product derived from oil, whose problems are well-known.

Moreover, the presence of the styrene monomer as reactive solvent in the polyester resin and thus in the mixture leads to several different environmental problems, connected to its harmful nature and to the risk of explosion tied to the high volatility; sophisticated and costly devices are in fact necessary for collecting and removing the styrene vapours in order to comply with the increasingly strict emission laws.

A further problem, up to now unresolved, is that of the rather considerable yellowing to which the articles (obtained from polyester resin with solvent) are subjected when exposed to ultraviolet rays. It is evident that this long-term problem, especially for the articles to be applied as external coverings of buildings, affects the article's aesthetic characteristics.

The object of the invention is therefore of making articles according to the Bretonstone technology, in which the mechanical and aesthetic characteristics obtainable using the previously mentioned binder resins are maintained while at the same time the above-described problems are overcome; in particular the presence of styrene in the mixture is eliminated.

Such object is attained with a process of the previously identified type which is characterised in that in the final article, the binder resin is a polyester resin lacking reactive solvent and formed by reaction between at least one epoxidised triglyceride and at least one carboxylic anhydride.

This is therefore a type of polyester resin used for the first time in the field of Bretonstone technology, wherein at least 50% by weight is obtained from raw materials of renewable origin, in particular vegetal origin, such as the epoxidised triglycerides, and from at least one carboxylic anhydride.

For detailed information on the polyester resins used in the present invention, reference can be made to the published German patent application No. DE10148672 A1.

Regarding the first previously mentioned component, several further specifications are appropriate.

Natural products, especially those of vegetal origin, contain a great quantity of fatty acids esterified with glycerine to form the triglycerides which can be extracted by means of known techniques.

In nature, fatty acids are almost never freely present, but are instead bound to an alcohol, the glycerol. Glycerol can bind from 1 to 3 fatty acids: there are therefore mono-, di-, and triglycerides of the fatty acids.

The fatty acids are composed of a chain of carbon atoms bound to hydrogen atoms, a chain which usually has a terminal bond with oxygen (O) or hydrogen and oxygen (OH).

The fatty acids are divided into short chain fatty acids (4÷8 carbon atoms), medium chain fatty acids (8÷14 carbon atoms) and long chain carbon atoms (14÷24 carbon atoms), as well as into saturated fats, monounsaturated fats and polyunsaturated fats.

The latter subdivision is very important, since the fatty acids have different physical and chemical properties depending on the level of unsaturation.

If the triglycerides are predominantly composed of saturated fatty acids (palmitic and stearic acid) or monounsaturated acids (oleic acid), then these compounds are solid at room temperature and are called 'fats', and in particular are of animal origin (lard, tallow).

If the triglycerides are predominantly composed of unsaturated fatty acids, mono-unsaturated (palmitoleic, oleic, gadoleic acid) or polyunsaturated acids (linoleic, linolenic acids), then these compounds are liquids at room temperature and are called 'oils', and in particular are of vegetal origin (olive seed oil, linseed oil, soybean oil, corn oil).

The saturated fatty acids have a linear spatial configuration which permits their arrangement in an ordered manner: this arrangement facilitates molecular interactions (hydrogen bridges) and consequently they have a high melting point.

The mono- and polyunsaturated fatty acids, due to the double bond which creates an electrostatic unbalance, do not have linear but rather sinuous molecules, so that, since they are unable to arrange themselves in an ordered manner, there are lesser bonds between the molecules and thus the melting temperature is lower. The greater the number of double bonds, the lower the melting temperature.

For use in the present invention, these oils are subjected to an epoxidation reaction of the double bonds present (a reaction which is per se well known), as in the following schematic representation:

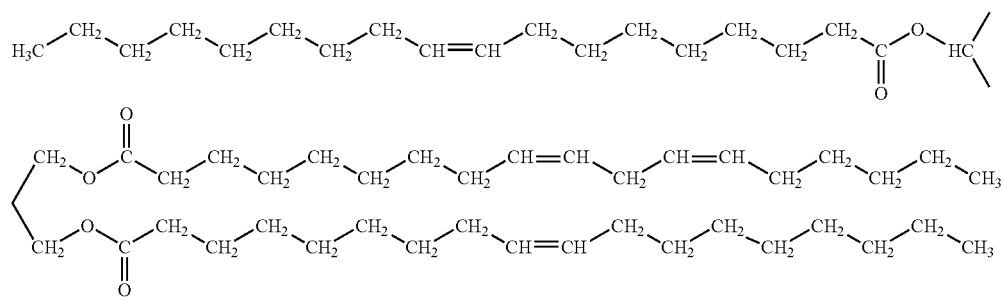
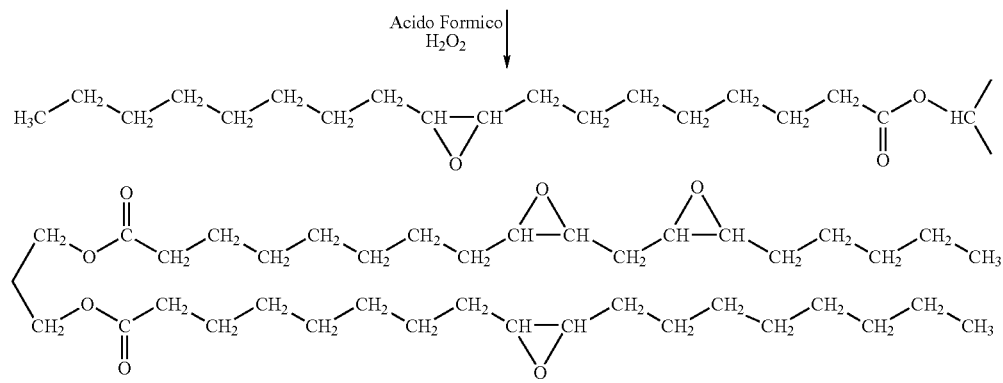

Trigliceride di acidi grassi epossidati

[Trigliceride di acidi grassi polinsaturi=Triglyceride of polyunsaturated fatty acids; Acido Formico=Formic Acid; Trigliceride di acidi grassi epossidati=Triglyceride of epoxidised fatty acids]

As regards the anhydride component, the chemical nature of these anhydrides (aliphatic or aromatic) affects the operational parameters and consequently also the final characteristics of the obtained resin. As an example, the formulas of two anhydrides are reported below, namely an aliphatic anhydride or of a saturated dicarboxylic acid, and an aromatican-hydride, obtained from an unsaturated dicarboxylic acid:

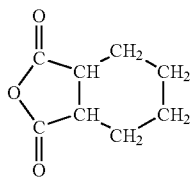   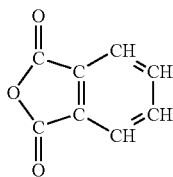

Anidride Alifatica    Anidride Aromatica

[Anidride Alifatica=Aliphatic; Anidride Aromatica=Aromatic Anhydride]

For the objects of the present invention, the following anhydrides can be used (indicated as a not limiting example): pyromellitic anhydride, maleic anhydride, succinic anhydride, hexahydrophthalic anhydride, phthalic anhydride, anhydride of norbornene dicarboxylic acid, adipic anhydride, glutaric anhydride, methylphthalic anhydride, 1,2-cyclohexyldicarboxylic anhydride, 3-methyl-1,2-cyclohexyldicarboxylic anhydride, 4-methyl-1,2-cyclohexyldicarboxylic anhydride, mixture of 3-methyl-1,2-cyclohexyldicarboxylic and 4-methyl-1,2-cyclohexyldicarboxylic anhydrides, methyl-tetrahydrophthalic anhydride, tetrahydrophthalic anhydride, methyl-5-norbornene-2,3-dicarboxylic anhydride, dodecenyl-succinic anhydride and mixtures of the same.

The mixture of epoxidised fatty acids and of one or more anhydrides, in the presence of an initiator and at a temperature between 80-180° C. depending on the additives used, solidifies and hardens.

The reaction diagram is reported below:

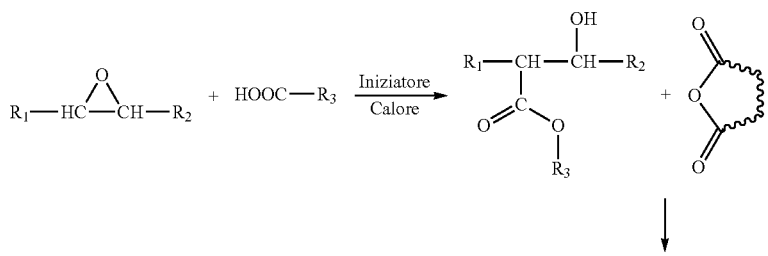

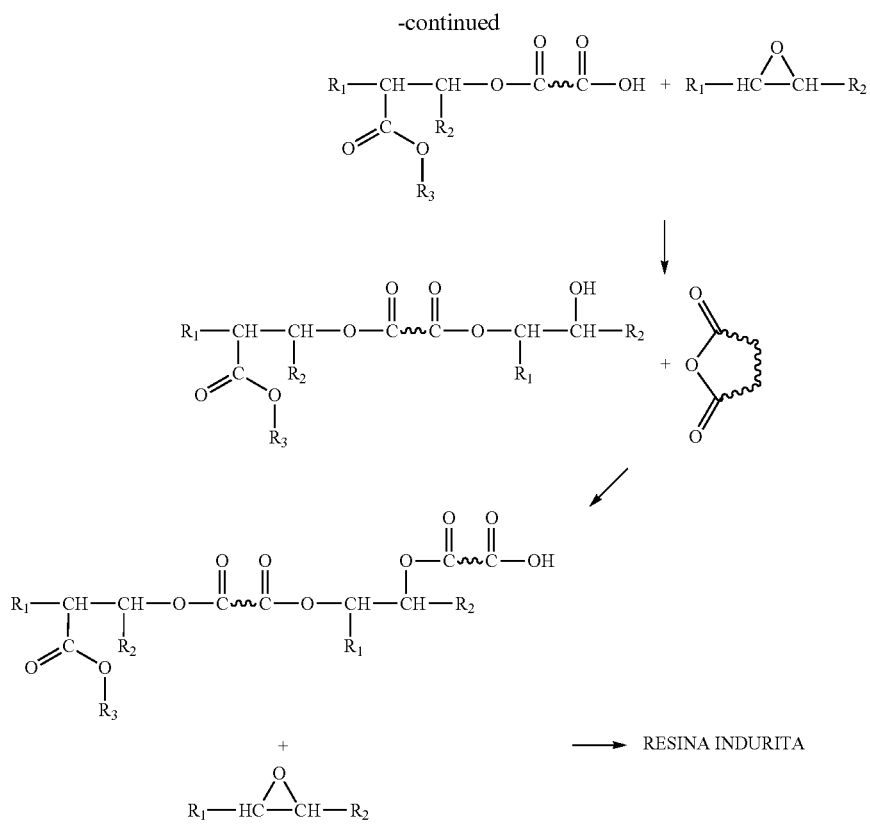

[Iniziatore=Initiator; Calore=Heat; Resina Indurita=Hardened Resin]

As indicated in the reaction diagram, in the process to form the resins the presence of a catalyst initiator is necessary, which, according to the nature and quantity, acts by reducing both the reaction times and the process temperatures.

The following can be listed from among the possible initiators: halides of alkaline metals, organometallic compounds of aluminium, zinc and tin, halides of quaternary ammonium, aliphatic and aromatic amines, boron and titanium based complexes.

The hardening of the resin with siliceous or calcareous particles leads to an agglomerate product with characteristics comparable to those obtained with polyester resins dissolved in a reactive synthetic monomer, both from the chemical and physical standpoint.

In the preferred embodiment of the present invention, since epoxidised oil is nearly completely saturated, use is preferred of aliphatic anhydrides since the resulting polyester resin is particularly resistant to the yellowing caused by the ultraviolet rays.

Among the advantages of the present invention, the use of a raw material—the triglycerides of natural fatty acids—available in abundance from natural sources must be emphasized, so that the process of the present invention is also advantageous from the economic standpoint.

The following non-limiting example illustrates the process of the present invention:

A slab was manufactured according to Bretonstone technology having the following composition by volume:

| | |
|---|---|
| Resin: | 19% |
| 325-mesh quartz filler: | 23% |
| 0.1-1.2 mm quartz granules: | 58% |
| The composition by weight of the resin was: | |
| Epoxidised linseed oil: | 55% |
| Methylcyclohexane dicarboxylic anhydride: | 20% |
| Norbonene-dicarboxylic anhydride: | 21% |
| 1-Methylimidazole in alcohol solution: | 4% |

The slab was treated in an oven at 140° C. for 40 minutes. After cooling, the following physical characteristics were verified:

| | |
|---|---|
| Bending strength: | 59 N/mm$^2$ |
| Deep abrasion resistance: | 225 mm$^3$ |
| UV treatment for 500 hours: | does not yellow |

It is noted that the mechanical characteristics are corresponding to those of a similar article made of a conventional synthesis polyester resin with styrene.

The article, morever, does not yellow if exposed to UV rays for 500 hours, unlike an analogous article made of a conventional synthesis polyester resin with styrene.

It should be noted that the Bretonstone technique also permits to make articles in block form, subsequently destined for sawing and finishing operations like the normal natural stone blocks extracted from quarries I. The present invention, as defined in the subsequent claims, is equally applicable to the manufacture of such blocks.

The invention claimed is:

1. A method of manufacturing an article that resists yellowing through ultraviolet light, the article in a form of one of a slab and a block, the method comprising the steps of:
    preparing an initial mixture of a binder resin and a stone or stone-like granulate material, the granulate material comprising a selected granulometry;
    depositing the initial mixture on one of a temporary support and a mould, the one of a temporary support and mould comprising dimensions of a slab or block;
    vacuum compressing the deposited mixture while applying a vibratory motion at a pre-established frequency; and
    hardening the binder resin of the vacuum compressed mixture at a temperature ranging from 80-180° C. so as to form the slab or block,
    wherein the binder resin comprises a polyester resin that is ultraviolet light resistant, lacks a reactive solvent, and is formed by reacting at least one epoxidized triglyceride and a carboxylic anhydride comprising 4-methyl-1,2-cyclohexyldicarboxylic anhydride or a mixture of 4-methyl-1,2-cyclohexyldicarboxylic and 3-methyl-1,2-cyclohexyldicarboxylic anhydrides, the at least one epoxidised triglyceride comprising epoxidised triglycerides from linseed oil, and
    wherein the formed slab or block does not yellow after exposure to UV rays for 500 hours.

2. The method of claim 1, wherein the binder resin further comprises a second anhydride selected from the group consisting of pyromellitic anhydride, maleic anhydride, succinic anhydride, hexahydrophthalic anhydride, phthalic anhydride, anhydride of norbornene dicarboxylic acid, adipic anhydride, glutaric anhydride, methylphthalic anhydride, 1,2-cyclohexyldicarboxylic anhydride, and mixtures of the same.

3. The method of claim 1, wherein the initial mixture further comprises a catalyst initiator.

4. The method of claim 3, wherein the catalyst initiator is selected from the group consisting of halides of alkaline metals, organometallic compounds of aluminum, zinc and tin, halides of quaternary ammonium, aliphatic and aromatic amines, boron, and titanium based complexes.

5. The method of claim 1, wherein said hardening takes place at a temperature of 140° C.

6. The method of claim 1, wherein the at least one carboxylic anhydride is 4-methyl-1,2-cyclohexyldicarboxylic anhydride.

7. The method of claim 1, wherein the binder resin is formed by reacting the at least one epoxidised triglyceride and the at least one carboxylic anhydride in the presence of an aromatic amine initiator.

8. The method of claim 7, wherein the aromatic amine initiator is 1-methyl-imidazole.

9. The method of claim 8, wherein the 1-methyl-imidazole is in alcohol solution.

10. The method of claim 1, wherein the initial mixture further comprises a filler.

11. The method of claim 1, wherein the stone or stone-like granulate material comprises 0.1 to 1.2 mm quartz granules.

\* \* \* \* \*